No. 717,171. Patented Dec. 30, 1902.
F. B. CONVERSE, Jr.
TYPE SETTING MACHINE.
(Application filed Dec. 12, 1901.)
(No Model.) 6 Sheets—Sheet 1.
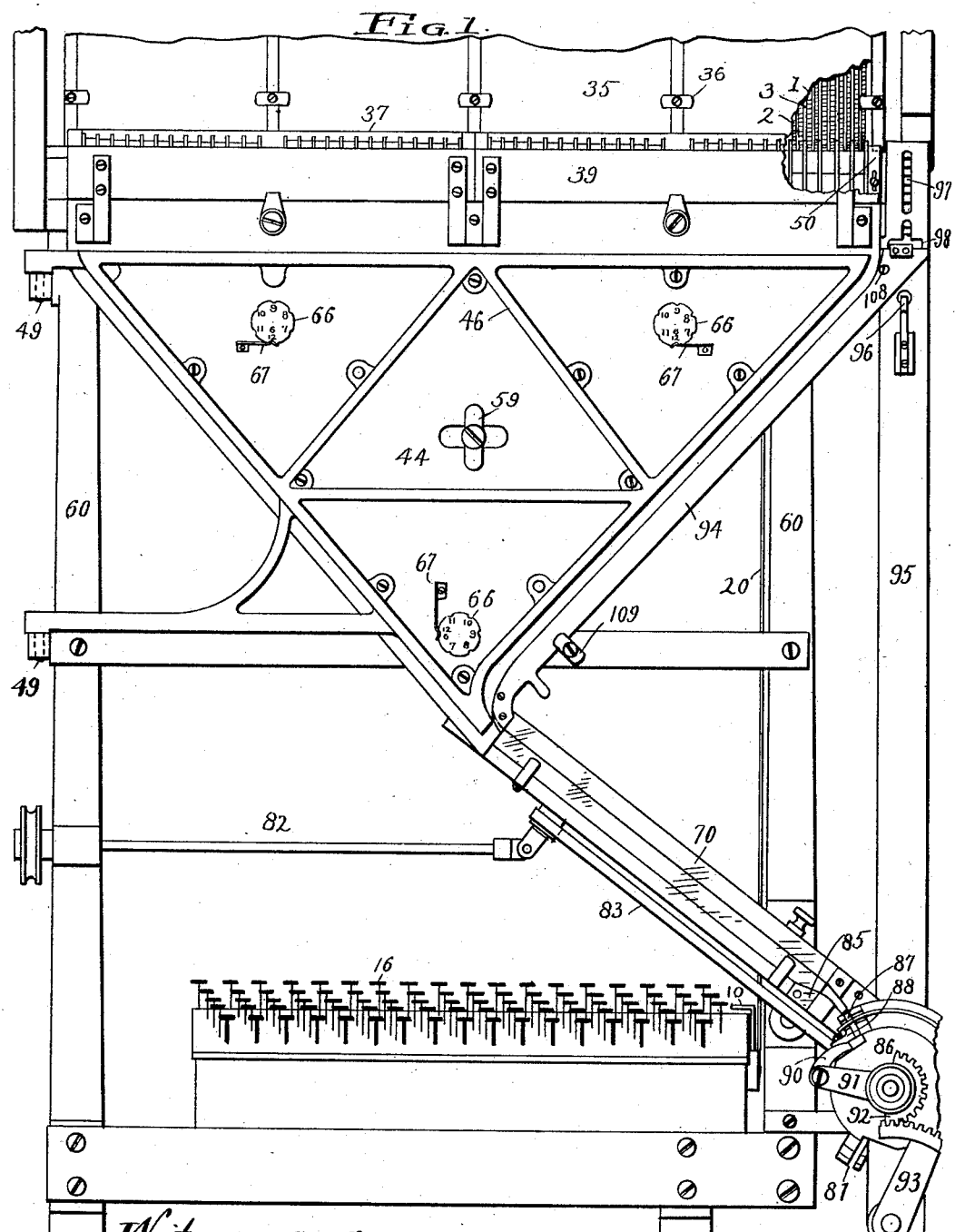

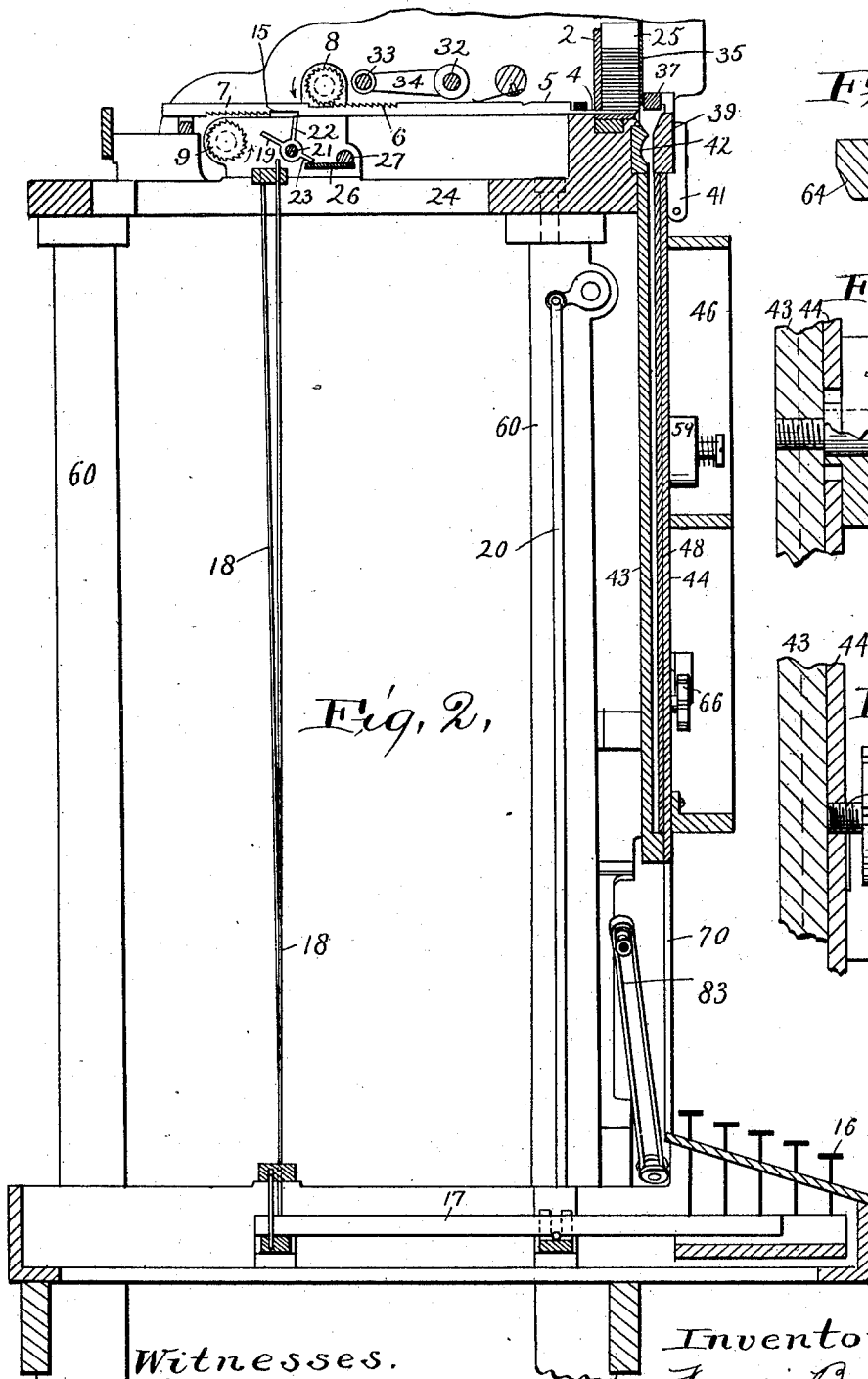

No. 717,171. Patented Dec. 30, 1902.
F. B. CONVERSE, Jr.
TYPE SETTING MACHINE.
(Application filed Dec. 12, 1901.)
(No Model.) 6 Sheets—Sheet 3.
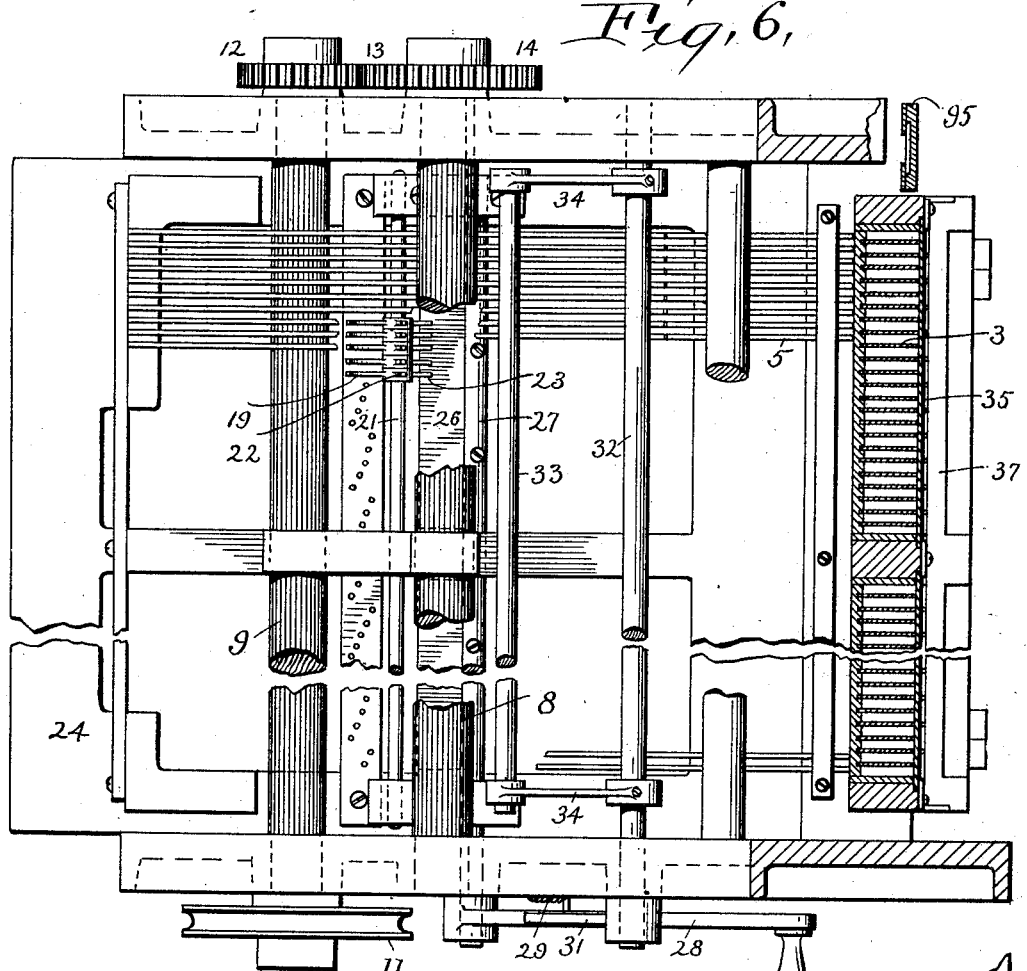
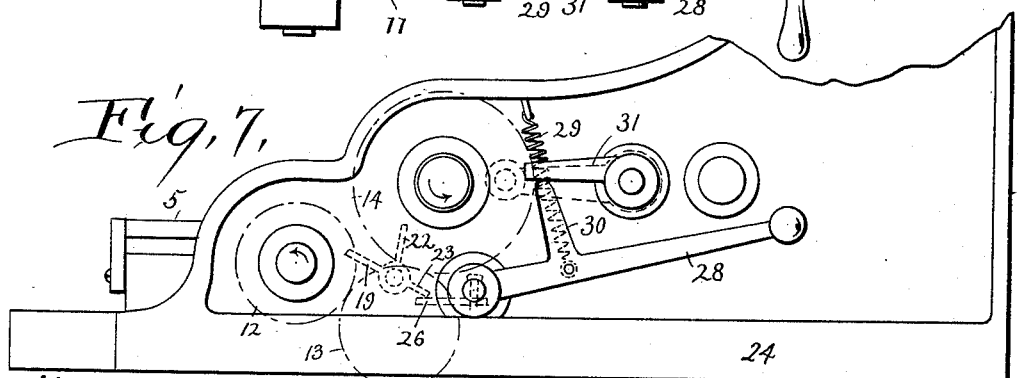

No. 717,171. Patented Dec. 30, 1902.
F. B. CONVERSE, Jr.
TYPE SETTING MACHINE.
(Application filed Dec. 12, 1901.)
(No Model.) 6 Sheets—Sheet 4.

Witnesses
E. B. Gilchrist
H. W. Wise

Inventor
Francis B. Converse Jr.
By his Attorneys
Thurston & Bates

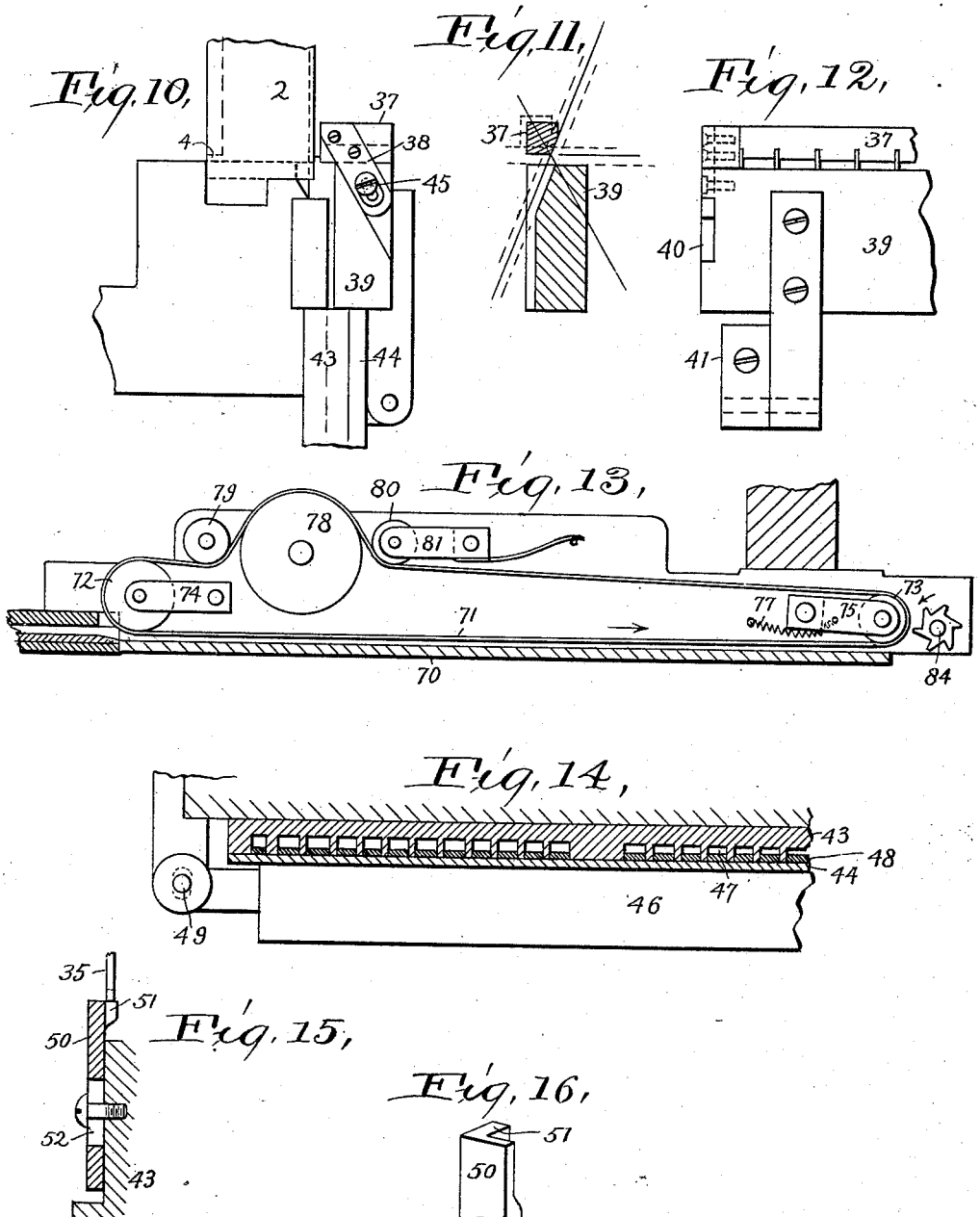

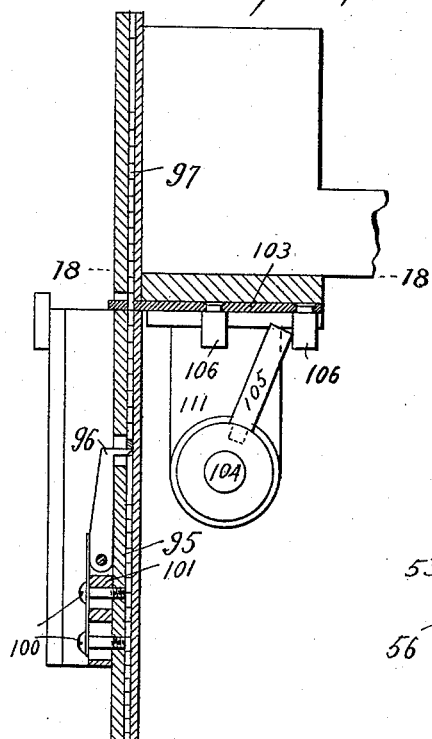
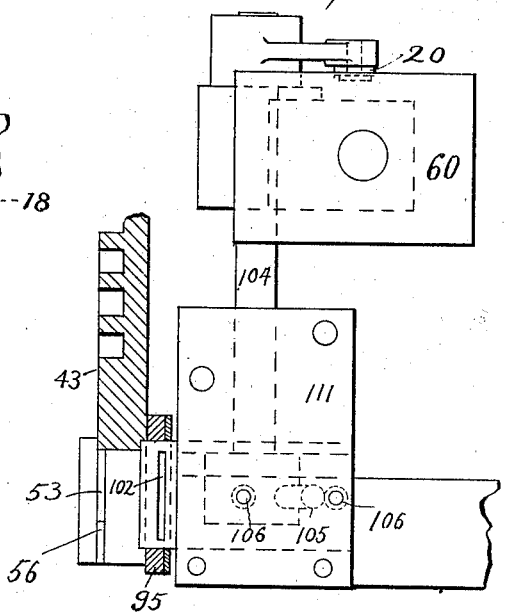
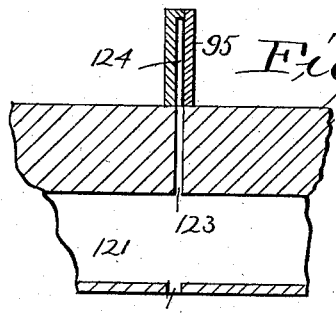
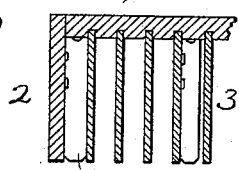
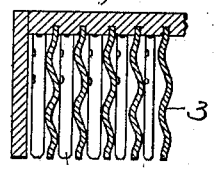
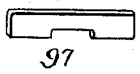

UNITED STATES PATENT OFFICE.

FRANCIS B. CONVERSE, JR., OF CLEVELAND, OHIO, ASSIGNOR TO THE CONVERSE MANUFACTURING COMPANY, OF CLEVELAND, OHIO, A CORPORATION OF OHIO.

TYPE-SETTING MACHINE.

SPECIFICATION forming part of Letters Patent No. 717,171, dated December 30, 1902.

Application filed December 12, 1901. Serial No. 85,561. (No model.)

*To all whom it may concern:*

Be it known that I, FRANCIS B. CONVERSE, Jr., a citizen of the United States, residing at Cleveland, in the county of Cuyahoga and State of Ohio, have invented a certain new and useful Improvement in Type-Setting Machines, of which the following is a full, clear, and exact description, reference being had to the accompanying drawings.

The primary object of this invention is to provide a type-setting machine adapted by very simple adjustments to set a variety of sizes of type. For the accomplishment of this there is provided a composite race-plate adapted to be swung open and having conduits down which the type may fall and means for simultaneously adjusting the size of the conduits for different fonts of type to insure their proper descent. Means are provided for indicating the font which the race-plate is adjusted to take. There is an adjustable bar across the upper end of the race-plate which is adapted to guide the type as they are ejected and swung downward into the plate. Other adjustments are provided for varying the machine according to the font employed and for increasing the efficiency and convenience of operation.

The present invention is an improvement on the mechanism shown in my prior application, Serial No. 8,690, filed March 15, 1900, and the interchanging type-cases and font adjustment shown herein are claimed in that application.

The invention may be best summarized as consisting of the arrangements and combinations of parts employed, as hereinafter explained and claimed.

Figure 8:
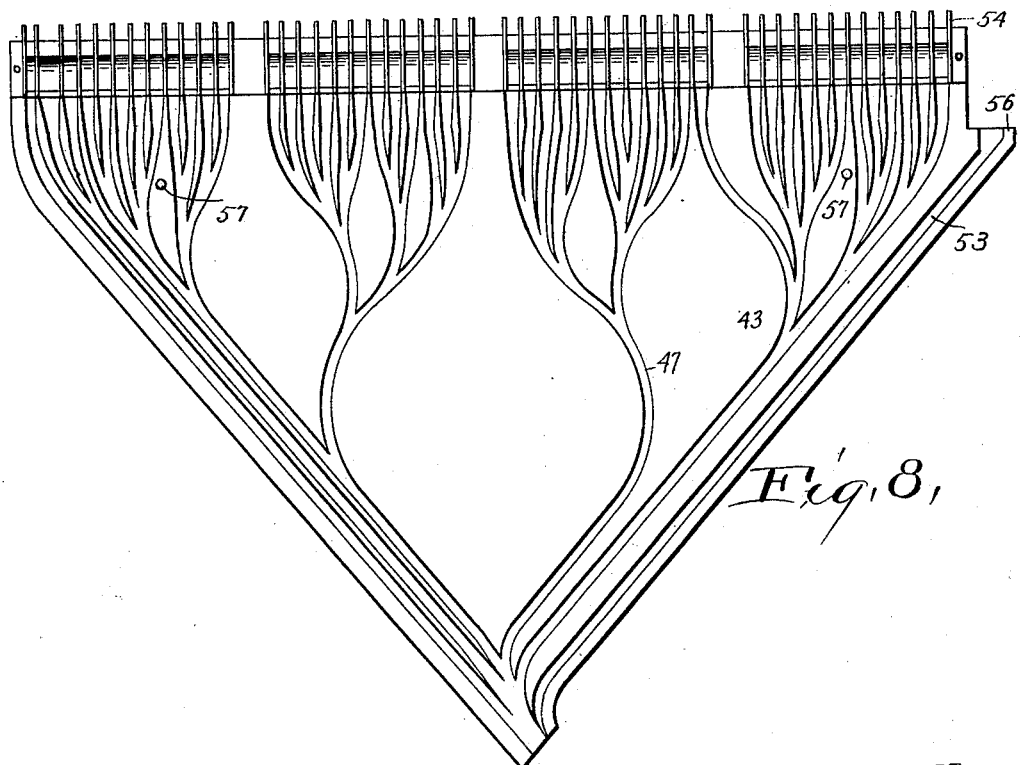
Figure 9:
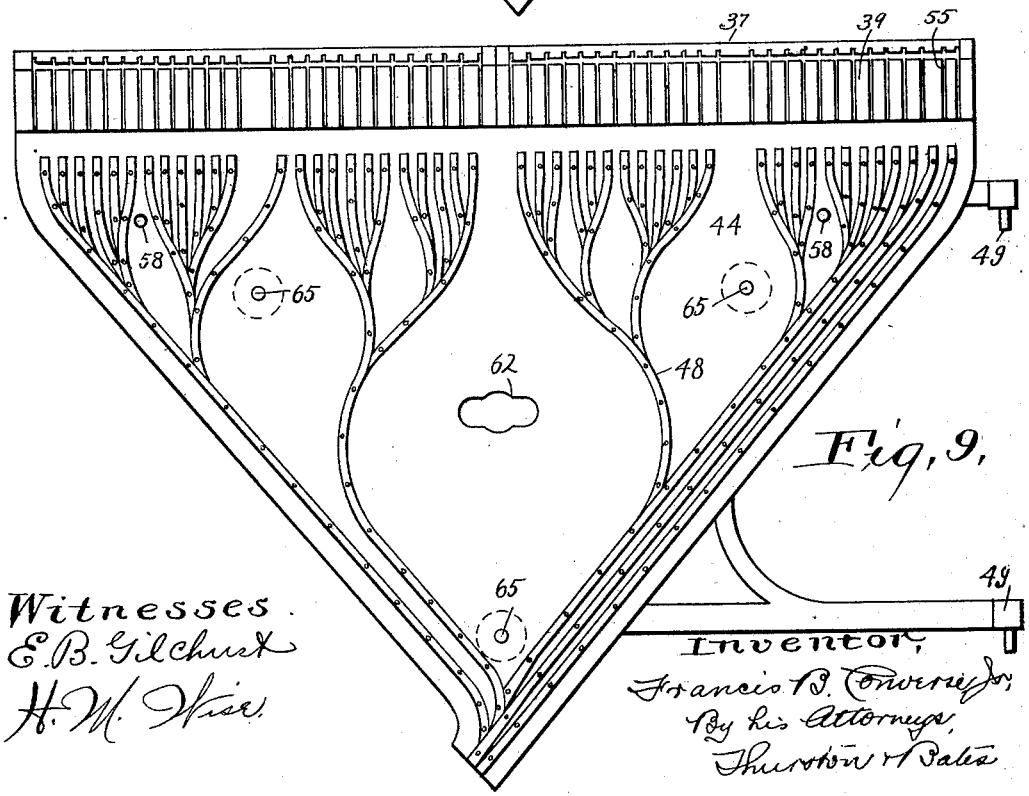

In the drawings, Figure 1 is a front elevation of the relevant portion of a type-setting machine embodying the present invention. Fig. 2 is a sectional side elevation thereof, the section following one of the channels in the race-plate. Fig. 3 is a detail view of the locking-button for the race-plate; Fig. 4, a cross-section of the button shown in Fig. 3; Fig. 5, a detail of the adjusting screw and knob. Fig. 6 is a plan sectioned through the type-cases and with some of the parts omitted for clearness. Fig 7 is a fragmentary side elevation of the upper portion of the machine. Fig. 8 is a detached elevation of the stationary member of the composite race-plate, and Fig. 9 is a similar view of the movable member of such race-plate. Fig. 10 is an end view of the hinged gate at the upper end of the race-plate and the adjustable guide-bar carried thereby. Fig. 11 is a vertical section across such gate and guide-bar, being in the nature of a diagram, and Fig. 12 is a front view of such gate. Fig. 13 is a sectional plan of the conveying-channel at the foot of the race-plate. Fig. 14 is a horizontal cross-section near the upper end of the race-plate. Fig. 15 is a detail in vertical section showing one of the blocks for adjustably supporting the plates in front of the type-cases. Fig. 16 is a perspective view of such block. Fig. 17 is a vertical section through the temporary space-case. Fig. 18 is a plan showing the mechanism for ejecting the temporary spaces, being taken just below the main upper frame of the machine and on the line 18 18 of Fig. 17. Fig. 19 is a horizontal section through the justifying-channel and the temporary space-case. Figs. 20 and 21 are fragmentary cross-sections of the type-cases employed. Fig. 22 is a perspective view of the temporary space preferably employed.

The type (designated 1) are contained in suitable vertical cases 2, which are divided by vertical partitions 3 into channels, each adapted to carry a pile of type on their flat sides. These type-cases, of which there are several in the machine, (the drawings show four,) are arranged side by side in a suitable frame. On the rear side of the cases are openings 4, Fig. 2, one for each channel, through which ejectors 5 may enter to shove the type from the case.

The ejecting mechanism shown in the drawings, which is deemed the preferred form, is as follows: There are a series of ejectors 5, each consisting of a longitudinally-movable bar arranged side by side behind the type-channels. These ejectors are provided with teeth 6 and 7 on both their upper and lower surfaces, and they extend between toothed rollers 8 and 9, which are continuously rotated in the direction of the arrows in Figs.

2 and 7 by the belt-pulley 11 on the roller 9 and the gears 12 13 14, connecting the rollers 8 and 9, the whole being carried by the upper horizontal frame 24, surmounted on the vertical standards 60. If the bar 5 is brought into engagement with the upper roller 8, it is drawn forward, while if it engages the lower roller 9 it is returned. Each ejector 5 is normally out of engagement with either roller 8 or 9, resting in its rearmost position, with a notch 15 directly over the roller 9. When, however, a key 16 in the keyboard is depressed, the lever 17 raises up a rod 18, which tips up the rear arm 19 of a bell-crank lever journaled on the cross-rod 21, whereupon the upper arm 22 of such lever raises the ejector into engagement with the roller 8. This roller, revolving, moves the ejector forward to shove the type out of the case until the notch 15 in the bar comes over the bell-crank arm 22, (the position shown in Fig. 2,) whereupon the bar drops out of engagement with the roller 8 and into engagement with the roller 9. The bar is returned by the movement of this latter roller, and this brings back the bell-crank into normal position. Now if the type in any of the cases are exhausted the ejector when thrown into action would engage the follower 25, Fig. 2, in the case, which is on top of the type, and this follower, being larger than the ejection-opening, stops the forward movement of the ejector. This locks the rollers 8 and 9 against rotation, the driving-belt slipping on the pulley 11. For the convenient return of the parts to their normal position in this emergency I provide the pivoted plate 26, extending across the machine, and each of the bell-cranks is provided with a forward finger 23, which engages such plate, the plate forming a stop for the finger. This plate is pivoted by being secured to the shaft 27, which has on its outer end an operating-crank 28. When this crank is drawn downward, the rearward free edge of the plate 26 is tipped upward, moving the bell-crank from under the ejector to allow it to descend. This crank is normally held elevated by a spring 29. A projection 30 of the crank, engaging the arm 31 on a rock-shaft 32, normally holds idly above the ejectors the cross-rod 33, held by a pair of arms 34, secured to the rock-shaft 32. From this construction it results that when the crank 28 is drawn downward this rod 33 descends by gravity and its weight forces out of engagement with the toothed roller 8 the locked ejector-bar, which is held by friction after the bell-crank is withdrawn. As soon as the rod thus causes the release of the locked ejector the rotation of the toothed shafts begins and the ejector is withdrawn by engagement of its teeth 7 with the roller 9. All but the lowest type are prevented from leaving their cases by the plates 35, suitably guided, as by buttons 36, and supported at their lower ends by the blocks 50, (of the form shown in Fig. 16,) which have rearwardly-projecting lugs 51, taking beneath the edges of the plates, and are adjustably held through the slots 52 to allow the plates 35 to be supported and various elevations for the different fonts of type to be in the cases.

Extending across the machine in front of the cases and near the lower edge is the horizontal guide-bar 37. Beneath this bar is the composite race-plate, composed of the stationary plate 43 and the adjustable plate 44. At the upper end of the adjustable plate is the gate 39, which is pivoted at 41 to allow access behind it, and the adjustable bar 37 is carried by this gate, as shown most clearly in Figs. 10 and 12. The adjustable bar has secured to it the diagonal strip 38, which occupies a diagonal seat 40 in the gate and is adjusted by a clamping-screw 45, taking through a slot in the strip. Thus the bar may be adjusted upward, but it necessarily moves rearward correspondingly. The type ejected from the cases pass beneath the bar 37 onto the ledge provided by the upper end of the gate 39 and then swing downward into a more or less nearly vertical position and drop into the channels of the race-plate. It has been found convenient to provide a concave surface 42 behind the gate to allow the convenient descension of the type. Now by referring to Fig. 11 it will be seen how this diagonal adjustment of the bar 37 allows different sizes of type to be ejected horizontally and then swing downward. As shown in solid lines therein, the small-size type may be ejected onto the ledge of the gate 39 and swing downward toward a vertical position behind the gate, while if the bar is adjusted into the position shown in dotted lines a much larger size of type may pass beneath it onto the ledge, and said size may also swing downward toward the vertical position, the opening between the corner of the bar and of the ledge being such as to prevent the type turning from its flat side. This diagonally-adjustable bar is one of the features of the present invention. The composite race-plate extends downward from beneath the bar 37. It is composed of the stationary plate 43 and the adjustable plate 44, the latter of which is shown as braced by suitable trussing 46. Grooves are formed in one of these plates and projections in the other, which enter the grooves, but do not fill them. As shown, the grooves 47 are in the plates 43 and the projections 48 on the plate 44. The side walls of the grooves and projections are formed of straight lines at right angles to the plates, so the plates may be adjusted toward and from each other, varying the dimension of the comprehended conduits in the forward-and-back direction without changing it in the other direction. The grooves are preferably so curved that their length and the frictional resistance which they present to the falling type shall cause the type to pass in the same time from any point at the upper edge of the race-plate to a common channel at the lower end, where all the grooves merge.

In constructing the race-plate it has been found very convenient to mill out the grooves in the plate 43 by a master-templet and then to place in these grooves bent strips of metal 48, which substantially fill them, and fasten these strips to the front plate 44 while they are held in the grooves of the plate 43. The projections enter the grooves sufficiently to allow the adjustment of one plate away from the other equal to the difference between the thickness of corresponding type in the largest and smallest fonts carried, and there will thus be closed conduits at any point of the adjustment. The backs of the grooves and the faces of the projections are flat. It has been found that this one-way adjustment is just what is desired, for the conduits may conveniently be plenty large enough to take all sizes in the other direction. In fact, it is convenient to make each conduit wide enough to take type from two consecutive cases, and such is the arrangement shown. Above the grooves and projections where the hinged gate 39 comes there are projections 54, carried by the stationary part, and coöperating grooves 55, carried by the gate. To provide convenient access to the interior of the plate for cleaning, &c., the plate 44 is hinged at 49. This hinging, however, is loose, the pintle taking into a slotted hole, as shown in Fig. 14, so that the plate may be adjusted in a right line with reference to the stationary part. When in place, the plate is guided by pins 57 on the stationary part, which take into openings 58 in the movable part. The plate is locked in place by the button 59, carried by a stud 61, projecting from the stationary plate, the button and stud being adapted to pass through an opening 62 in the movable plate and the button having beveled edges 64 being pressed toward the stationary plate by the spring 63. The movable plate carries screw-studs 65, of which three are shown, which are adapted to bear against the stationary plate and limit the approach of the movable plate. These studs carry knobs or heads 66, which are marked with figures or numbers indicating the fonts of type comprehended by the conduits, and suitable detent-springs 67 are preferably provided for holding them normally in place. The marking may be on either the screw-head or the plate. In either case there is a relatively stationary point on the other member from which the measurement takes place. This point, as shown in the drawings, is the point of the spring itself. The drawings show the numbers ranging from "6" to "12" on these knobs. These numbers indicate the fonts of type on the point system which the channels may take, these sizes being otherwise known as "nonpareil," "minion," "brevier," "bourgeois," "long primer," "small pica," and "pica," though of course, if desired, the initial letters of these names or other designations could be employed. As shown in the drawings, the knobs indicate that the machine is adjusted either for nonpareil or pica; but the range between these is so large that a simple observation of the position of the bar 37 would show which it is. When the type reach the lower end of the race-plate, they come into a common channel, whereby they are conveyed as desired. This channel is comprehended between the glass plate 70 and the belt 71, which is continuously traveling in the direction of the arrow behind the glass plate. This belt is shown as held to the plate by rollers 72 73 on pivoted arms 74 75, the latter drawn toward the plate by the spring 77. The belt is shown as tightened around the driving-pulley 78 by rollers 79 and 80, the latter on the spring-pressed arm 81. The pulley 78 is rotated in any convenient manner, as by the universal shaft 82, connecting with the lower end of the pulley-shaft. As the type reach the lower end of the belt they come against the wiper-wheel 84, which is continuously rotated, as by a belt 83, from the shaft of the pulley 78, and this feeds them forward into the assemblage member or composing-stick 86. This member, as shown, carries radial channel 87 (of which three is a convenient number) and is adapted to receive the set line and transfer it to some suitable justifying mechanism. The channel is adjusted by the angle-strip 88, and the mouth of the belt-trough leading thereto is adjusted by the pivoted plate 85. In the form shown in Fig. 1 the assembled line is transferred for justification by a third of a rotation of the member 86 by the pawl 90, arm 91, gears 92, and arm 93.

The machine shown is adapted as the words are being assembled to set between them suitable temporary spaces during justification. The temporary spaces may be of the form shown in Fig. 22. Figs. 1 and 17 show a case 95, into which the temporary spaces are adapted to be fed after they have been so replaced. Replacement is accomplished in a horizontal justifying-channel 121, which may lie at the right of the temporary space-case behind the assemblage member 86 in position to have the type fed from the assemblage member into it. At the proper point a permanent space is shoved by a suitable ejector (not shown) through a notch 122 into the justifying-channel, shoving out ahead of it the temporary space 97 through a notch 123 into the lower portion of the temporary space-case. In this position the temporary space lies on the upper side of a plunger 124, which is adapted to be actuated by suitable means (not shown) to raise the temporary space above a suitable retaining-pawl 125. At a proper time this plunger may be given a greater actuation sufficient to feed the temporary spaces up the space-case until the desired number of them are retained at the upper end, it being understood that the temporary space-case is more or less nearly full of temporary spaces all the time. This double movement of the plunger 124 is claimed in my prior application, Serial No. 699,697, filed December 19, 1898.

A suitable spring-pawl 96, extending into the upper portion of the temporary space-case, retains above that point a suitable number of temporary spaces 97. This pawl is accurately adjusted by the screws 100 taking through the slotted block 101, to which the pawl is pivoted, so that one of the temporary spaces supported in the case above the pawl occupies the slot 102 in the plate 103, with the lower edge of the temporary space flush with the lower surface of the plate. This engaged temporary space and those above it constitute at least as many as the maximum number required in any line. The plate 103, is slidably carried by the frame-bracket 111 and is shoved forward whenever a temporary space is to be introduced by the space-key 10, whose depression raises the bar 20, which oscillates the rock-shaft 104. This shaft carries the projecting pin 105, which takes between two lugs 106, projecting downward from the plate 103. The operation, therefore, of the depression of the space-key 10 is to shift forward the plate 103, carrying the entrained temporary space over the upper end of the channel 53 in the stationary race-plate 43. At this point the temporary space rests with one end on the ledge 56, around which corner it swings by gravity and slides down the channel 53. The space between the pins 106 allows the plate 103 to stand in this ejection position long enough for the temporary space to drop out of it while the projecting pin 105 is swinging back the distance between the pins 106. The plate 103 is only as thick as the body of the smallest font used in the machine, wherefore it may take all of the sizes of temporary spaces employed. A plate 94, pivoted at 108 near its upper end and held below by a button 109, covers the channel 53, but allows convenient access thereto for cleaning.

A suitable range of type, as from pica to bourgeois, may be carried in the same type-cases. For a greater range an interchangeable case is provided having the same outside dimensions and the same distance between the channels, but with the effective size of the channels reduced. This may be easily provided by vertically corrugating the partitions, whereby the comprehending size of the channels is brought down to carry type, carrying from brevier to nonpareil without changing the distance between the centers of the channels or materially increasing the weight of the partitions. This is illustrated in Figs. 20 and 21.

From what has been described it will be seen that by simply turning the adjusting-knobs of the race-plate, varying the position of the cross-bar, adjusting the blocks 50, pivoted plate 85, and the strips 88 and changing the type-cases (and when an automatic justifier is employed changing the set of temporary spaces) adjustment may be conveniently made in the machine all the way from nonpareil to pica, or from six-point to twelve-point type, while adjustment of several sizes may be made by simply turning the knobs 66 and adjusting the cross-bar 37.

Having described my invention, I claim—

1. A type-setting machine having a composite adjustable race-plate of which one member has grooves leading from many points above to a common point below and the other member has projections adapted to take into said grooves, one of said members being hinged whereby it may swing away from the other member but being provided with means when it is engaging the other member for adjusting it in a path perpendicular to that member.

2. In a type-setting machine, the combination of a stationary race-plate, a movable race-plate adapted to coöperate therewith, a hinge connecting said two plates comprising a pintle occupying an elongated hole, one of said plates having grooves and the other projections entering said grooves, and screw-studs carried by one of said plates and governing the adjustment of the two plates.

3. In a type-setting machine, an adjustable race-plate composed of a stationary plate and a coöperating plate movable with reference thereto, said movable plate being hinged whereby it may be swung clear of the stationary plate, a stud carried by the stationary plate, a button on said stud, a spring pressing said button toward the stationary plate there being an opening in the movable plate through which said button may take and across which it may turn, and screw-studs limiting the approach of the two members.

4. In a type-setting machine, the combination of a stationary race-plate, a hinged race-plate adapted to coöperate therewith, one of said plates having grooves and the other projections entering but not filling the grooves, and screw-studs screwing through the hinged race-plate and adapted to abut against the stationary plate and limiting the approach thereto of the hinged plate, and indicating-heads on said screws on the front side of said hinged race-plate.

5. The combination of an adjustable race-plate composed of two plates comprehending conduits between them which lead from many points above to a common point below, and means for ejecting type to pass into the upper end of the race-plate and a horizontal bar extending across the type being ejected and arranged to be adjustable upward and backward from the edge of the race-plate so that the type of various sizes may be ejected beneath it and swing downward around its front edge.

6. In a type-setting machine, the combination with the means for holding a supply of type, of a composite race-plate having channels down which the type may pass, said race-plate being located in front of and below said supply, means for ejecting the type from the supply onto the edge of the race-plate where they may swing down into a more or less nearly vertical position and pass into the race-plate, a horizontal bar extending across such swinging position, said bar being supported by members adjustable in a diagonally upward and rearward direction so that the space beneath the bar through which the type may pass horizontally and the space in front of its lower edge around which the type may turn into a more or less vertical position may be simultaneously and proportionately increased or diminished.

7. In a type-setting machine, the combination of type-cases for holding the type, plates for closing the front side of said cases, adjustable blocks for holding said plates at the proper distance above the lower edge of the case to allow the bottom type alone to be ejected, an adjustable race-plate having conduits down which the type may pass when ejected, and an adjustable cross-bar extending across the ejection position and serving to guide the type when they are passing from the cases into a race-plate, said parts coöperating to allow the use of several fonts of type.

8. In a type-setting machine, a race-plate having conduits leading from several points above to a common point below, combined with a traveling belt and a coöperating surface, the belt being adapted to clasp type between it and such surface, and rollers around which such belt takes, said rollers being on shiftable axes to allow the belt to give back for larger sizes of type, and a spring tending to shift the axis of one of said rollers toward said coöperating surface.

9. In a type-setting machine, the combination of a race-plate having conduits leading from several points above to a common point below, a conveying mechanism leading from said common point and comprising an unyielding plate and a belt traveling parallel therewith, said belt passing at each end about rollers on shiftable axes to allow the belt to give back for different sizes of type, and means for driving said belt.

10. In a type-setting machine, the combination of a plurality of ejector-bars having teeth, a toothed roller with which the same may engage, a bar extending across the ejector-bars, and means for moving said bar to engage the ejector-bars to move them out of engagement with the roller.

11. In a type-setting machine, the combination of a plurality of ejector-bars having teeth, a toothed roller with which they may engage, fingers for moving said ejector-bars into engagement with said roller, finger-keys for operating said fingers, and mechanism for withdrawing a finger from engagement with an ejector-bar and for moving such ejector-bar out of engagement with the roller.

12. In a type-setting machine, the combination of a plurality of type-channels, a plurality of ejector-bars adapted to eject type therefrom and having teeth, a roller with which said teeth may engage whereby the rotation of the roller actuates the ejector, a bar extending across the ejector-bars, mechanism for moving said ejector-bars into engagement with the roller and supporting them in this position, and mechanism for simultaneously releasing said support and moving said bar into engagement with the ejectors to withdraw them from the toothed roller.

13. In a type-setting machine, the combination of a series of ejector-bars having teeth, a toothed roller with which said bars may engage, a series of fingers for moving said bars into engagement with the roller, finger-keys for operating said fingers, a pivoted releasing-bar with which said fingers may engage, and means for moving said bar on its pivot to force the fingers out of engagement with the ejector-bars.

14. In a type-setting machine, the combination of a pair of toothed rollers, a series of ejector-bars extending between them and having teeth on their upper and lower surfaces adapted to engage with either roller, a series of fingers beneath the ejector-bars adapted to raise them into engagement with the upper roller, a pivoted stop-plate with which such fingers engage when said bars are so raised, finger-keys adapted to operate the fingers to cause such raising, a bar extending across the ejectors above them and adapted to descend on them to move them out of engagement with the upper roller, and lever mechanism adapted to simultaneously swing said stop-plate to move the fingers out of engagement with the bars and operate said bar to move the ejectors out of engagement with the upper roller.

15. In a type-setting machine, the combination with mechanism for setting type, of a temporary-space case, a channel leading downward from near the upper end of the temporary-space case and communicating with the type-channel, a plate intersecting the temporary-space case and having an opening adapted to normally aline therewith, and means for moving said plate to shift the temporary space entrained in said opening above the discharge-channel therefor.

16. In a type-setting machine, the combination with mechanism for setting type, of a temporary-space case, a channel leading downward from near the upper end of the temporary-space case and communicating with the type-channel, means intersecting the temporary-space case for moving the temporary space above the discharge-channel therefor, and a pawl below said plate and extending into the temporary-space case and adapted to retain above it temporary spaces with one of them in position for ejection.

17. In a type-setting machine, the combination with mechanism for setting type, of a temporary-space case, a channel leading downward from near the upper end of the temporary-space case and communicating with the type-channel, a plate intercepting the temporary-space case and having an opening adapted to normally aline therewith, and mechanism for moving said plate forward and backward which allows a temporary pause of the plate over the discharge-channel.

18. In a type-setting machine, the combination with mechanism for setting type, of a temporary-space case, a channel leading down ward from near the upper end of the temporary-space case and communicating with the type-channel, means for moving a temporary space from its case to a point above the discharge-channel therefor, and a pivoted plate covering said discharge-channel and adapted to be swung aside for cleaning it.

19. In a type-setting machine, the combination of type-cases, a composite race-plate leading downward therefrom, to a common point, said composite race-plate including a stationary member and a hinged member adapted to be swung away therefrom, a temporary-space case leading upward to a point adjacent to the ejection position of the type-cases, a channel leading downward therefrom to the common channel of the type, and a pivoted plate for covering said temporary-space channel.

20. In a type-setting machine, the combination of an upright type-case, a plate extending upward along the front of the type-case and serving the purpose of a cover therefor, a block which supports said plate and serves to hold it in position to prevent the ejection of any but the lowest type in the case, and means for clamping said block in various adjusted positions.

In testimony whereof I hereunto affix my signature in the presence of two witnesses.

FRANCIS B. CONVERSE, JR.

Witnesses:
ALBERT H. BATES,
E. B. GILCHRIST.